Aug. 27, 1929.  A. L. KNAPP  1,726,183
MOTOR VEHICLE
Filed Oct. 29, 1925   2 Sheets-Sheet 1

Inventor
Archer L. Knapp
By Mullin Silletts
Attorney

Aug. 27, 1929.　　　A. L. KNAPP　　　1,726,183
MOTOR VEHICLE
Filed Oct. 29, 1925　　　2 Sheets-Sheet 2
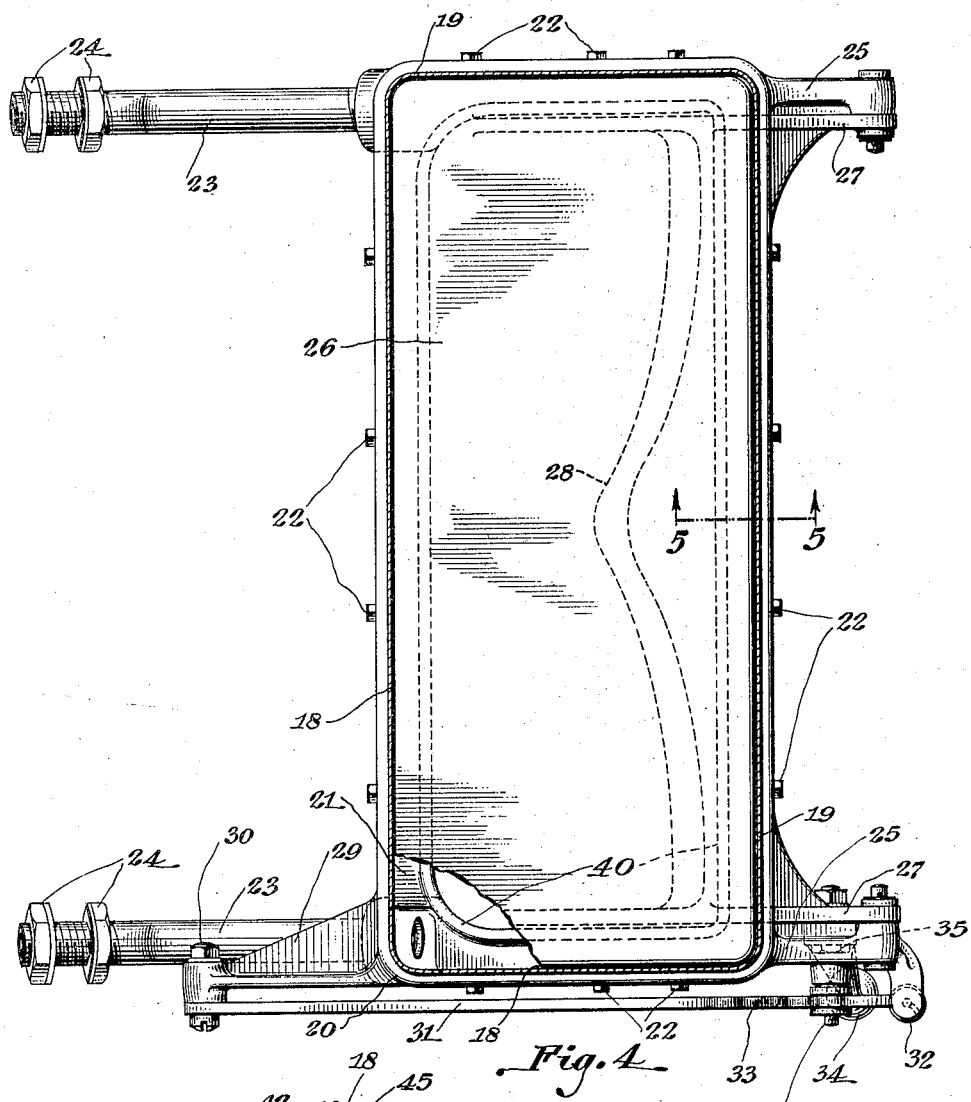
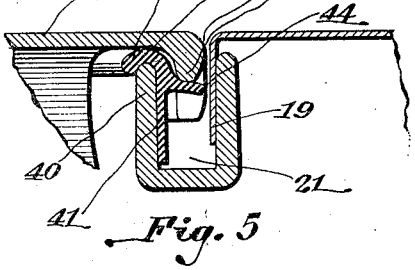
Inventor
Archer L. Knapp
By
Attorney Patented Aug. 27, 1929.

1,726,183

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 29, 1925. Serial No. 65,548.

This invention relates to motor vehicles and particularly to the body construction thereof.

One of the objects of the present invention is to provide a simple and efficient closing means for an opening in the body.

Another object of the invention is to provide a body ventilator with simple and efficient sealing means around the opening.

Another object of the invention is to provide a flexible sealing means for a body ventilator of the type in which the ventilator is lightly held in its closed position.

Another object of the invention is to provide a panel supported frame with brace means to a rigid part of the vehicle.

Another object of the invention is to provide drain means for a ventilator with connections so that said means will also form a brace for the ventilator frame.

Another object of the invention is to provide a simple and efficient connection between a body panel and the ventilator frame thereof.

Other objects of the invention will appear from the following description taken in connection with the drawings, which form a part of this specification, and in which:

Fig. 4 is a plan view substantially on the line 4—4 of Fig. 2, the cowl panel being cut-away to illustrate the ventilator frame and other parts, and Fig. 5 is an enlarged section on the line 5—5 of Fig. 4.

Figure 1:
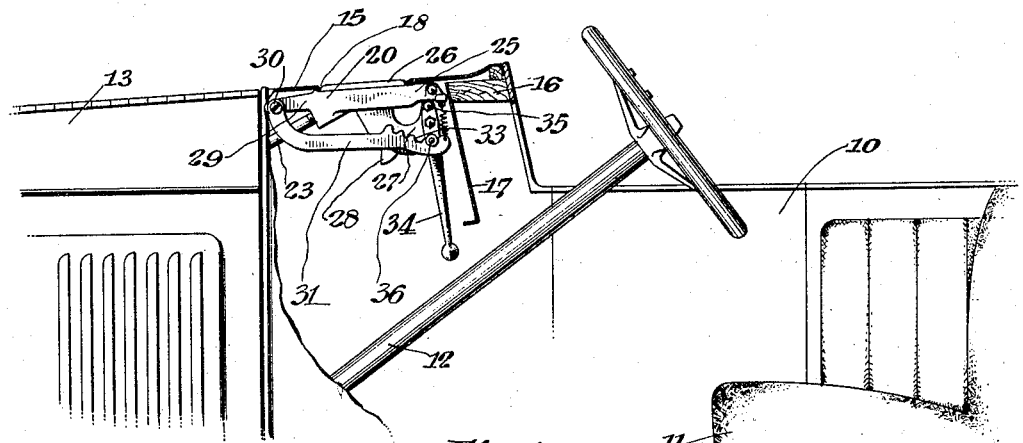
Fig. 1 is a cut-away side elevation of a portion of a motor vehicle embodying the invention.
Figure 2:
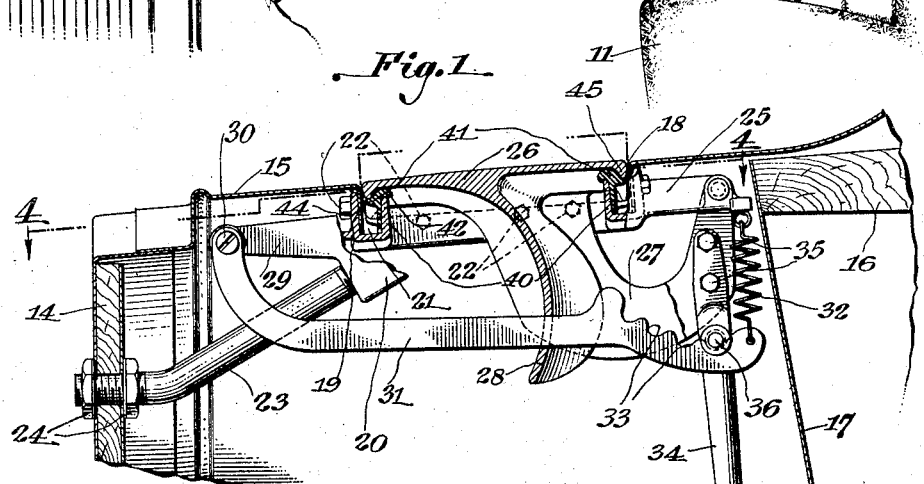
Fig. 2 is an enlarged section through the cowl and dash of the motor vehicle shown in Fig. 1, the section being taken through the cowl ventilator.

Referring to the drawings, 10 represents generally the body of a motor vehicle, 11 being the front or driving seat, 12 the steering column, and 13 being the hood which covers the engine which is arranged forwardly of the dash 14. One of the body panels of the vehicle is partly supported by the dash 14 and extends rearwardly in the form of a cowl 15 being supported at its rear end by a cross member 16 of the body. A cowl or instrument board 17 extends downwardly from the cross member 16 as in the usual body construction.

The cowl or cowl panel 15 is formed with a ventilating opening 18, and as shown particularly in Fig. 4, this opening is of rectangular form and the metal of the panel 15 is bent inwardly at the opening forming a flange 19.

It is desirable that this ventilating opening 18 may be opened or closed as weather conditions demand, and when the opening is closed, it is desirable that it should be efficiently sealed against both air and water. The means for doing this comprises a frame 20, which may be a casting, made the shape of the opening 18 and supported by the cowl 15 just inside the opening. This frame is in the form of a trough or gutter as shown at 21 and the flange 19 extends into this gutter and is secured to the outer wall thereof as by the several screws or bolts 22.

In order that the frame or casting 20 may be additionally supported so that the cowl panel 15 will not be warped or bent as the ventilator is operated by the mechanism hereinafter described, each forward corner of the frame 20 is provided with a brace 23 which extends to and through the dash 14, with nuts 24 on either side of the dash for securing the brace thereto. Each of these braces 23 is shown in the form of a pipe so that it thereby forms a drain from the trough or gutter 21 of the frame 20, and any water that runs into the gutter 21 from the cowl will be drained off through the pipe 23 to a point forwardly of the dash 14 where it drains to the road beneath the car.

Figure 3:
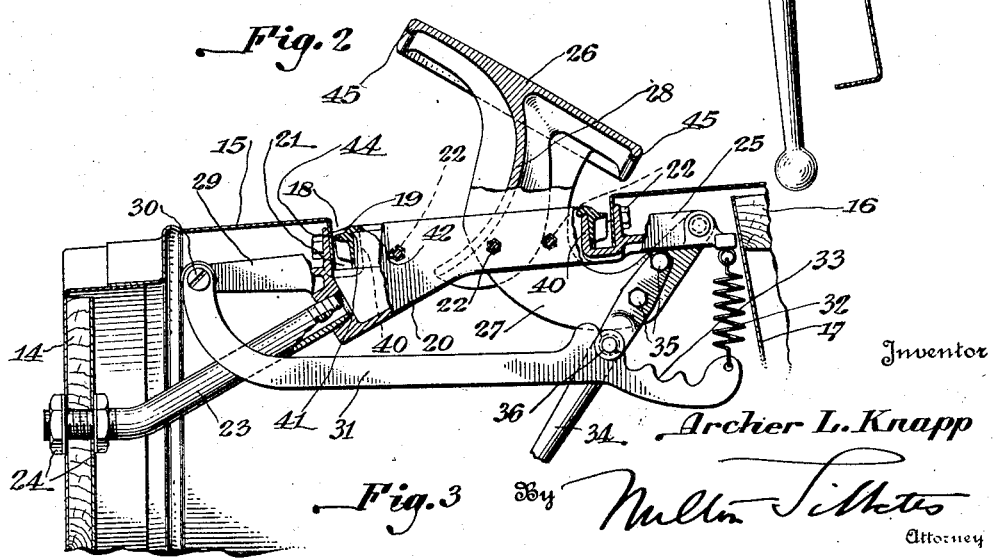
Fig. 3 is a view similar to Fig. 2 with the ventilator in open position.

The frame 20 is formed with two rearwardly extending arms 25, one at each rear corner of the frame, and to these arms a cover 26 for the opening 18 is pivoted through a pair of U-shaped arms 27. The arms 25 are preferably formed as an integral part of the frame 20, and the arms 27 are likewise formed as an integral part of the cover 26. The latter are made in the shape shown so that the cover may be opened as shown in Fig. 3. The cover is also provided with a suitable deflector 28 which distributes the incoming air to both sides of the body under the cowl.

The frame 20 also has an integral arm 29 extending forwardly therefrom and at one corner thereof for supporting the pivot 30 of a locking arm 31 which arm extends rearwardly to a point near one of the arms 25 to which it is connected by a tension spring 32. The arm 31 is formed with several notches 33, as shown in the various figures, and an operating lever 34 secured to one of the arms 27 of the cover as by the bolts 35, has a pin 36 arranged in the path of said notches 33 so that as the cover 26 is moved by the operating handle 34 the pin 36 will move from one notch to another. The spring 32 will tend to retain the arm 31 with the pin 36 in one of these notches 33 and the arm 31 is forced downwardly on its pivot as the operating lever arm 34 is moved by the operator.

With this construction it will be seen that it is a very easy matter to so position the notch nearest the free end of the arm 31 relative to the pin 36 on the cover 26 that the cover will always be brought down to a definite and preferably flush position with relation to the cowl panel 15, and yet the spring 32 will only lightly retain the cover in that position so that it will be an easy matter for the operator to move it from closed position to any one of the several open positions of adjustment.

It is very desirable that this lightly held position of the cover shall not be interfered with by the sealing means provided between the cover and the cowl and yet that sealing means must be effective to prevent either water or air from entering the vehicle body through this ventilating opening. To provide a rubber strip for the cover to be pressed against as it is closed would not make a good seal because the surface is so large that considerable pressure would have to be exerted to make a tight joint with that construction. One of the features of this invention, therefore, is to provide a very flexible lip for a portion of the cover to contact with in its closed position so that the mechanism which lightly holds the cover in closed position in definite relation to the cowl will not be interfered with and so that a more positive closing means for the cover will not be required.

The frame 20 has upon the inner wall 40 of its gutter 21 a rubber or similar flexible strip 41 which may be cemented to said inner wall, or friction may be relied upon to retain the rubber strip in place. For the purpose of obtaining sufficient surface contact between this rubber strip and the wall 40 and for definitely positioning it in the gutter, the strip may extend upwardly over the end of the wall 40 as shown at 42. This part 42 of the rubber strip, however, is not intended to contact with the inner surface of the cover 26, clearance between the part 42 of the strip and the cover being shown as at 43.

The rubber strip 41 has a flange or lip 44 which is thin and very flexible and which extends from the wall 40 into the gutter substantially in a horizontal plane or substantially in a plane parallel to the surface of the cover or cowl adjacent the ventilating opening. The cover 26 is preferably formed with an inturned peripheral flange 45 which is adapted to extend into the gutter 21 and into contact with the lip 44 so that the lip is pressed downwardly slightly as the cover 26 is moved to closed position. Since this lip 44 is very flexible as shown and as described, it will give or bend under the slight pressure of the cover as it is brought into closed position and the spring pressure of the locking arm 31 against the pin 36 will easily retain the cover 26 in its closed position with definite relation to the outer surface of the cowl and yet there will be a full and efficient seal between the cover and the cowl formed by this flexible lip or flange 44.

It will be seen that the rubber strip 41 is on the inner wall 40 of the gutter 21 so that the water that passes into the gutter from the cowl will be drained off by the gutter and the pipes 23 before it reaches the rubber strip 41, or at least it will not drain down over the rubber strip as the case would be if the strip were mounted or supported by the opposite wall of the gutter. Thus there will be no rotting of the rubber or of the cement or glue that retains it in place.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the cambination with the cowl having a ventilating opening, of a cover for said opening having a peripheral flange extending into said opening and leaving a slight clearance between the edge of the cover and the edge of the opening, a frame supported by the cowl having a part extending circumferentially within the flange of said cover when the latter is in closed position, and means on said frame part forming a sealing between the frame part and the cover and comprising a flexible strip supported on said frame part extending horizontally therefrom with its free edge engaging the perimeter of the flange of said cover when the latter is in closed position.

2. In a motor vehicle, the combination with a body panel having an opening therein, of a cover for said opening, said cover having a flange normal thereto, a sealing strip supported by the panel having a flexible sealing flange normal to the flange on said cover so that the flange of said cover has a normal bearing on said flexible flange when the cover is in closed position.

3. In a motor vehicle, the combination of a body panel having an opening therein, of a cover for said opening adapted to be opened and closed and when in closed position to lie flush with the surface of said panel, said cover having an inturned flange around its edge, and means supported by said panel for making a joint with said cover comprising a flexible lip extending over the edge of the opening and a second flexible lip substantially parallel with the cover and co-extensive with said flange and adapted to provide a seat for said flange when the cover is in closed position.

4. In a motor vehicle, the combination with the cowl thereof having an opening therein, of a cover for said opening, means for lightly retaining the cover in closed position exteriorly flush with the cowl, and a flexible strip extending over the edge of the opening and having a portion extending substantially parallel with the cowl surface adapted to provide a seat for the cover and to seal the joint between the cowl and the cover.

5. In a motor vehicle, the combination with the cowl thereof having a ventilating opening, of a cover for said opening, said cover having an inturned flange, means for retaining said cover in closed position exteriorly flush with the cowl surface, a rubber strip supported by the cowl having a portion extending substantially parallel with the cowl surface adapted to engage the perimeter of the flange of the cover when closed.

6. In a motor vehicle, the combination with the dash and the cowl having a ventilating opening therein, of a ventilator frame secured to the cowl at said opening, said frame formed with a gutter, and drain means extending from said gutter to said dash forming a brace for the frame.

7. In a motor vehicle, the combination with the cowl thereof having a ventilating opening, a frame secured to the cowl at said opening and formed with a gutter co-extensive with the opening, a cover for said opening pivoted to the frame and having a peripheral flange extending into said gutter, and a rubber strip supported on the inner wall of said gutter and having a flexible lateral lip extending parallel to the bottom of the gutter where it will contact with the flange of said cover and be depressed thereby.

8. In a motor vehicle, the combination with the dash and the cowl extending rearwardly therefrom and having a ventilating opening therein, of a frame connected to said cowl at said opening and forming a gutter around said opening, and separated drain pipes connecting with said gutter and extending from said frame to and through said dash for draining said gutter and bracing the frame in position.

9. In combination with a ventilator, a sealing strip therefor comprising a band having lateral projections extending from one edge and from the body of the band intermediate the edges thereof in opposite directions.

10. In a motor vehicle, the combination of a body panel having a ventilating opening therein, of a cover for said opening, a member retaining said cover in a definite relation to the surface of said panel when the cover is in closed position, a flexible strip supported by said member having lateral portions extending substantially parallel with the surface of said cover and arranged to engage the perimeter of the retaining member and to contact with the perimeter of the cover when in closed position, so that one of the lateral portions is slightly bent forming a seal between the panel and the cover.

In testimony whereof I affix my signature.

ARCHER L. KNAPP.